United States Patent Office 3,314,536
Patented Apr. 18, 1967

3,314,536
PACKAGING ADHESIVES IN CASINGS
Rudolph B. Janota, Lansing, and Dino J. Zari, Western Springs, Ill., assignors to Swift & Company, Chicago, Ill., a corporation of Illinois
No Drawing. Filed Dec. 10, 1962, Ser. No. 243,605
8 Claims. (Cl. 206—84)

This invention relates to a packaging container and a process for filling up and packaging tacky polymeric materials which are sticky when molten and at room temperatures. More specifically, this invention concerns a means for packaging hot-melt adhesives and a process for packaging such hot-melt adhesives in the molten state.

Hot-melt adhesives are usually thermoplastic adhesives and find usage in bonding a wide variety of materials. These adhesives are used to bond metal to metal such as aluminum foil to aluminum rods, side seams in metal cans, paper to paper, flexible package films to themselves and, also, to paper, wax carton stock to itself, polyethylene to glass, aluminum to Styrofoam, and in many other applications. Hot-melt adhesives are used advantageously because they increase the speed of production, that is, the speed with which they produce a bond. They also have 100% solids and, hence, are economical to use. Furthermore, they usually do not contain or produce volatile materials such as flammable organic solvents or toxic substances. Hot-melt adhesives are usually indifferent to extreme heat or cold and, hence, no storage precautions are needed to insure safe stocking and storage of these products.

However, very serious difficulties have been encountered in devising suitable containers for packaging and transporting these tacky, polymeric substances since such substances adhere to almost everything. In the past, if a hot-melt adhesive did not block (the property of sticking to itself), it could be handled by permitting the hot-melt to cool or to be artificially cooled by refrigeration followed by a choice of various methods to granulate the product to the desired particle size. This may also be accomplished with some of the hot-melts even though they block, if they are hard enough to chop by one means or another or if they are held in a frozen state by the use of artificial cooling methods such as Dry Ice. However, many hot-melt formulations have permanent tack and/or are to soft to decrease the particle size very readily or on a practical scale.

Various means of packaging hot-melts have been tried, all without complete success. If the hot-melts are packaged in paper bags, the paper becomes so firmly bonded to the polymeric material that it cannot be stripped off, even by tedious manual operations, without leaving large quantities of paper fibers imbedded in the surface of the polymeric material. These fibers, if left imbedded in the hot-melt material, impart highly injurious properties to the finished products made therefrom. Metal containers have been used, but such containers make it necessary for the ultimate consumer to heat the material or chop it after cooling before he can use it. Even heating the metal containers is not satisfactory since it is still difficult to remove the materials due to the fact that they adhere to metal, even when they are in the molten state. Furthermore, it is not a safe practice to handle the hot containers (350°–400° F.) by manual means.

Attempts have also been made to extrude and chop the melts into small particle size or in rope form. Attempts have also been made to use various plastics such as polyethylene, polypropylene, etc., for packaging such materials. However, many of these plastic product packaging materials are practically useless since they are too sensitive to heat. Furthermore, various plastic materials which are heat-resistant and do not tend to adhere to the hot-melts, are difficult to form into suitable packaging materials, and/or are economically unsound.

In some cases, granulating or grinding the hot-melt adhesives in a frozen condition followed by dusting with a material such as calcium stearate or inert clays so as to prevent them from sticking together to form a large mass can be utilized. However, granulating or grinding is applicable only to those hot melts which do not block and are relatively hard and brittle, unless one is willing to accept the extra processing costs which are encountered by freezing the hot melt and introducing a dusting agent to prevent blocking when stored at room temperature. Furthermore, the dusting material used to impart nonblocking may detract from the adhesive properties of the hot melts.

It is, therefore, an object of this invention to provide a packaging container for molten adhesives which are sticky in the molten, as well as in the solid, state.

It is also an object of this invention to provide a packaged hot-melt adhesive whose container may be easily removed from the packaged adhesive.

It is a further object of this invention to provide packaged hot-melt adhesives whose containers are able to withstand exceedingly high temperatures and, also, maintain the necessary strength required at the time of filling.

A still further object of this invention is to provide a process for packaging extremely hot molten, hot-melt adhesives.

Additional objects, if not specifically set forth herein, will be readily apparent to those skilled in the art from the detailed description of the invention which follows.

In general, this invention relates to the packaging of tacky thermoplastic materials in containers comprising regenerated cellulose. The regenerated cellulose containers are able to withstand the temperatures of the molten hot melts (usually ranging between room temperature and 400° F.) and they possess the required strength necessary at the time of filling. Furthermore, the containers of this invention possess the release properties needed for hot-melt adhesives. In order to use the hot-melt adhesives, which are packaged in accordance with the teachings of this invention, one need only immerse the packaged adhesive in water for a short time before using. The water causes the regenerated cellulose container to swell and permits its easy removal by peeling.

Hot-melt adhesives, intended to be packaged in accordance with the instant invention, are thermoplastic polymers which are liquid at some elevated temperature yet set to a strong solid when cooled. They are bonding agents which achieve a solid state and resultant strength by cooling, as contrasted with other adhesives which achieve the solid state through evaporation or removal of solvents. Prior to heating, a hot-melt adhesive is a thermoplastic, 100% solid material, all adhesive. Application of heat brings the substance to a liquid state, and after removal of the heat, it sets by simple cooling.

There is a wide variety of ingredients that go into making a hot melt. The formulator has a wide selection of usually low-molecular weight, natural and synthetic waxes and resins to choose from. These include: polyamides; rosins and its derivatives such as hydroabietyl alcohol; coumarone-indene resins; mineral, vegetable, and petroleum waxes; terpene resins; alkyds; heat-stable phenol-formaldehyde resins; butyl rubber; saturated polyesters; natural asphalts and vegetable and coal-tar pitches, etc. These ingredients usually have low strength and melt easily to low viscosity fluids. In order to be converted to more useful adhesives, higher molecular weight polymers are blended therewith. Higher molecular weight polymers, which are typically blended with the natural and synthetic waxes and resins to toughen or reinforce the same, include polyvinyl acetate and its derivatives, ethyl cellulose, butyl methacrylates, ethyl acrylate and its copolymers such as copolymers of ethyl acrylate and ethylene, polyethylene and its copolymers, polystyrene and styrene copolymers, polyisobutylene, ethylene and vinyl acetate copolymers, etc. While hot-melts are usually a blended mixture of various polymers, it should be understood that any one of the above-mentioned ingredients may be used singly or in combination depending upon the properties desired. In addition, the hot-melt adhesives normally contain a liquid plasticizer, either monomeric or resinous. The finished adhesives also contain pigments, fillers and antioxidants.

Very good hot-melt adhesives have been formulated from polyamides derived from dimerized unsaturated higher fatty acids such as linoleic acid, and polyamines such as ethylene diamine and diethylene triamine, along with polyvinyl acetate and its derivatives and polyethylene. These hot melts have been utilized in bonding metal foil such as aluminum foil, paper, plastic films, fabrics, glass, leather, etc.

In accordance with the present invention, the molten hot-melt adhesives, usually at a temperature of about 225° F. to 400° F., are permitted to flow into a regenerated cellulose container having the desired shape. A most preferred embodiment comprises extruding the molten hot-melt adhesive into a shirred regenerated cellulose casing having a diameter of about 1 to 3 inches and being about 50' in length when fully extended. After the casing is filled, it is removed from the extrusion horn and the open end of the casing is securely fastened. After the packaged hot-melt adhesive has cooled, it can be rolled into a coil or cut into various lengths.

The hot-melt adhesives can also be packaged by filling cavities which are surrounded by regenerated cellulose film. During the filling process, the regenerated cellulose container is usually supported. For example, a metal or plastic mold may be lined with regenerated cellulose sheets. Even buckets may be lined with the regenerated cellulose film and the molten hot-melt adhesive poured in. The hot-melt adhesive is allowed to cool and the mold or frame support is then removed leaving a solid hot-melt adhesive packaged in the regenerated cellulose film.

When using seamless tubing, i.e., casing, the diameter may vary from ¾" to about 3" or more. The actual diameter and length of the casing is merely a matter of choice and after the packaged hot-melt adhesive is cooled, one may cut the article into any desirable length. In general it has been found that best results are obtained when the wall thickness of the regenerated cellulose casing is about 1 to about 2 mils. When it is desirable to package hot-melt adhesives in larger quantities, say for example 4" to 5" square by 20" to 24" in length, the regenerated cellulose film may be coated on kraft paper to give increased strength and thickness. In this case, the thickness will then be between about 2.5 and 3.5 mils.

In the present invention, regenerated cellulose is considered to be that derived from cellulose xanthate solutions (viscose). Without attempting to expand on viscose production, which is well covered in both patent and technical literature, it suffices to describe its production only in general.

Cellulose is soaked in cold 16°–20° Bé. caustic solution and the excess alkali removed. The alkali cellulose is aged cold and converted to the xanthate ester by means of carbon disulfide. The final steps include solution in dilute alkali to form viscose, and aging the solution until ready for extrusion into the desired form.

Other forms of regenerated cellulose such as those derived from cuprammonium or zinc chloride solutions are equally effective so long as they are susceptible to moisture. Cellulose ester films such as the acetate, nitrate, butyrate, etc., are undesirable since they do not release under moist conditions, and they lose all their strength at temperatures below those needed for most molten hot-melts.

The regenerated cellulose film readily transmits water and swells which permits the easy removal of the film from the hot-melt adhesive. The release properties of the regenerated cellulose from the hot-melt adhesive was quite unexpected since in general hot-melt adhesives are hydrophobic materials which retain their adhesive qualities even when wet. Furthermore, the ability to withstand bursting at elevated temperatures (350°–400° F.) was unexpected. These properties of regenerated cellulose make the filling of molten hot-melt adhesives feasible, practical and safe.

The following examples are presented to illustrate the invention. It will be understood that the examples are illustrative and should not be taken in any manner as limiting the invention as defined in the appended claims.

EXAMPLE I

A molten hot-melt adhesive comprising 84.5 parts of Versamid No. 100, 10.5 parts of Versamid No. 940, 4.8 parts of Butvar B-98 (polyvinyl butyral), 0.2 part of urea, and 1.5 grams of Anti Foam A (a silicone resin) per 100 pounds of the above ingredients was poured into a cylinder having a heavy wall construction. The Versamids are polyamide resins produced by the condensation of polymerized linoleic acid with lower alkylene polyamines such as ethylene diamine and diethylene triamine. This hot-melt adhesive has a viscosity of 3–5 poises at 375° F., is amber in color and is quite sticky and cold flows at room temperature. The molten hot-melt adhesive was forced out through an extrusion horn by the application of air pressure at the top of the cylinder. A shirred regenerated cellulose casing, having a diameter of about three inches, was secured to the horn and allowed to be filled with the molten adhesive. After the casing was filled and extended about fifty feet, the valve on the cylinder was shut off and the casing removed. The open end of the casing, which had been telescoped over the extrusion horn, was immediately sealed by means of a string. After the packaged hot-melt adhesive had cooled, it was cut with an axe into lengths of about one foot. In order to ues the hot-melt adhesive, the packaged product was placed under cold tap water for about one minute or so. The casing swelled, and, possessing excellent release properties, was easily peeled away from the adhesive.

The following adhesive formulations were compounded and packaged in accordance with the procedure set out in Example I.

*Adhesive B*

| | Parts |
|---|---|
| Titanium dioxide | 2.4 |
| Paraffin wax (M.P. 127–131° F.) | 18.0 |
| Pentaphen No. 67 (para-tertiary amyl phenol) | 1.0 |
| Ethyl cellulose N-10 | 18.7 |
| Glyceryl monoricinoleate | 14.7 |
| Epon 1001 (bisphenol A-epichlorohydrin) | 28.0 |
| Hydrogenated tallow fatty acids | 16.4 |

This adhesive is milky white, has a viscosity of about 10 poises at 330° F. and is a good example of a material that blocks.

*Adhesive C*

| | Parts |
|---|---|
| W. W. Rosin (refined wood rosin) | 50.0 |
| Monoplex DDA (di-iso-decyl adipate) | 15.0 |
| Ethyl 702 (anti-oxidant) | 0.5 |
| Elvax 220 (ethylene-vinylacetate polymer) | 29.5 |
| Zytel nylon 61 (polyamide resin) | 5.0 |

This adhesive is amber in color, has a viscosity of about 4 poises at 360° F. and about 12.3 poises at 300° F. and a rosin odor when wet. It is stable for about up to 6 months, its setting time is around 10–20 seconds and is tacky at room temperature. Toluene and perchlorethylene are solvents which can be used to clean up this adhesive.

Adhesive D

| | Parts |
|---|---|
| Piccolyte S–125 SF (terpene-hydrocarbon resin) | 25.0 |
| Staybelite resin (hydrogenated rosin) | 49.5 |
| Vistanex LMMH (polyisobutylene) | 15.0 |
| Anti-oxidant (2,6-di-tert-butylphenol) | 0.5 |
| Elvax 150 (ethylene-vinylacetate polymer) | 10.0 |

This adhesive is amber in color and has a viscosity of about 10.2 poises at 380° F. and about 47.8 poises 310° F. It has the property of blocking, and no odor when dry but a slight rosin odor when wet. Perchloethylene and toluene can be used to clean up this adhesive.

Adhesive E

| | Parts |
|---|---|
| W. W. Rosin (refined wood rosin) | 50.0 |
| Anti-oxidant (2,6-di-tert-butylphenol) | 0.5 |
| Monoplex DDA (di-iso-decyl adipate) | 10.0 |
| Elvax 150 (ethylene-vinylacetate polymer) | 39.5 |

This adhesive is amber in color and has no odor when dry but a slight rosin odor when wet. It has good resistance to solvents and excellent resistance to water and temperature variations between —10° F. to about 100° F. Its setting time is about 10–12 seconds.

Adhesive F

| | Parts |
|---|---|
| Piccolyte S–125 (a terpene hydrocarbon resin) | 23.2 |
| Vistanex LMMH (polyisobutylene) | 23.3 |
| Epolene C (a low molecular weight polyethylene) | 43.0 |

This adhesive is light yellow and also has the property of blocking.

The above-mentioned adhesives were packaged both in regenerated cellulose casings and in pails lined with regenerated cellulose film. In order to use the hot-melt adhesives, the packaged products were placed under tap water for a few minutes. In all cases the casing swelled and was easily torn away from the adhesive.

Perhaps the most outstanding facet of the present invention is the fact that the regenerated cellulose film possesses outstanding release properties. It was first thought that the cellulose containers would have to be coated with releasing agents or dusted with, say, calcium stearate before being filled in order for the adhesive to release from the film when the hot-melt was needed. It was, therefore, quite unexpected to find that the mere wetting of the regenerated cellulose container would enable one to readily peel off the film, leaving the adhesive free from any contaminating cellulose film particles. This was also surprising since most work was done on hot-melts that were quite tacky even when cool or wet. The particular properties of regenerated cellulose appear to be unique since other cellulosic derivatives do not possess the desired features. For example, it is impossible to remove cellulose acetate film from packaged hot-melt adhesives due to the fact that either the hot melt is designed to adhere to such substances or the heat of the molten hot melt softens the cellulose acetate so that it becomes part of the hot melt.

The particular regenerated cellulose films and tubes utilized in the instant invention can be either transparent or opaque. They can be colored so as to distinguish various grades or types of hot melts.

It is apparent that many modifications and variations of the invention as hereinbefore set forth may be made without departing from the spirit and scope thereof. Specific embodiments described in the examples and specification are given by way of illustration only, as it is obvious to the hot melt formulator that all types of raw materials, whehter natural products or synthetic materials, may be packaged in accordance with the teachings of the instant invention. It is also obvious to the adhesive technologist that one may modify the now existing materials by blending them to suit particular requirements. Accordingly, regenerated cellulose films may be used to package either the stock commercial polymers or the new synthetic polymers and hence the invention is to be limited only by the terms of the appended claims.

We claim:
1. A method for packaging a molten, hot-melt adhesive which sticks to regenerated cellulose comprising: extruding a molten, hot-melt adhesive having a temperature between about 310° F. and about 400° F. into a shirred regenerated cellulose casing whereby said shirred casing is simultaneously extended by and filled with said molten, hot-melt adhesive and subsequently reforming the filled casing into a convenient package.

2. A method for packaging a molten, hot-melt adhesive which sticks to regenerated cellulose comprising: heating a hot-melt adhesive to a temperature of between about 350° F. and about 400° F., extruding said hot-melt adhesive into a shirred regenerated cellulose casing whereby said casing is simultaneously extended by and filled with said molten, hot-melt adhesive and subsequently subdividing the filled casing so as to form compact units of packaged adhesive.

3. The method of claim 2 wherein the diameter of said casing is more than about three-quarters of an inch.

4. The method of claim 2 wherein the diameter of said casing is between about three-quarters of an inch and about three inches.

5. As an article of manufacture, a coil comprising, a long, continuous, seamless, regenerated cellulose tubing having a diameter of about three-fourths inch to three inches filled with a tacky, thermoplastic material which sticks to said regenerated cellulose tubing, said tacky, thermoplastic material having the property of being substantially molten at temperatures between about 310° F. and about 400° F. and being substantially solid at room temperatures.

6. As an article of manufacture, a long, continuous, seamless, regenerated cellulose tubing having a diameter of between about three-fourths inch and three inches filled with a hot-melt adhesive which sticks to said regenerated cellulose tubing, said hot-melt adhesive having the property of being substantially molten at temperatures between about 310° F. and about 400° F. and being substantially solid at room temperatures.

7. As an article of manufacture, a regenerated cellulose casing having a diameter of about three-fourths inch to three inches and a length of about one foot filled with a hot-melt adhesive which sticks to said regenerated cellulose casing, said hot-melt adhesive having the property of being substantially molten at temperatures between about 350° F. and 400° F. and being substantially solid at room temperatures.

8. An article of manufacture comprising a substantially solid hot-melt adhesive encased in a continuous film comprising a laminate of regenerated cellulose and paper, said hot-melt adhesive being in intimate contact with the regenerated cellulose portion of said film and said hot-melt adhesive having the property of being substantially molten at 350° F. to 400° F. and being substantially solid at room temperatures.

References Cited by the Examiner

UNITED STATES PATENTS

| | | | |
|---|---|---|---|
| 2,306,278 | 12/1942 | Reichel et al. | 206—84 |
| 2,806,595 | 9/1957 | Spake | 206—84 |
| 2,977,267 | 3/1961 | Douthitt | 206—56 |

THERON E. CONDON, *Primary Examiner.*

EARL J. DRUMMOND, GEORGE O. RALSTON, LOUIS G. MANCENE, *Examiners.*

J. M. CASKIE, *Assistant Examiner.*